Oct. 31, 1939.    H. J. LOFTIS    2,178,077

VIBRATION DAMPENING MOUNTING

Filed Feb. 24, 1938

INVENTOR.
Homer J. Loftis,
BY
George D. Richards
ATTORNEY.

Patented Oct. 31, 1939

2,178,077

UNITED STATES PATENT OFFICE 2,178,077

VIBRATION DAMPENING MOUNTING

Homer J. Loftis, Ironton, Ohio, assignor to Henrite Products Corporation, Ironton, Ohio, a corporation of Ohio Application February 24, 1938, Serial No. 192,311

1 Claim. (Cl. 248—358)

This invention relates to vibration dampening mountings for supporting mechanisms of various kinds the operation of which induces vibration involving tendency to transmission of tremor and to production of undesirable noise or hum; and the invention has reference, more particularly, to a vibration dampening mounting suitable for supporting dynamo-electric machines, automobile motors and other mechanisms in connection with carrying framework therefor.

Conventional mountings for the purposes mentioned have in most cases comprised an annular body of solid rubber bonded to and between outer and inner metallic supporting rings or bands, and, when in use, such mountings are subjected to torsional vibration, vibratory forces transmitted thereto sets up reactions in the solid rubber body in the form of desired shear and tensional stresses, but which desired stresses are partially and to an undesirable degree nullified by a component of compression.

This invention has for an object to provide a novel form and construction of mounting for the purposes mentioned wherein the desired stresses of shear and tension are more efficiently availed of and counteracting components of compression are substantially eliminated. To this end the novel mounting, according to this invention, comprises an annular body of vulcanized rubber bonded to outer and inner metallic supporting rings or bands, said body having portions thereof removed to form therein spaced radial sections, each capable of substantially independent action when subjected to transmitted vibratory forces. That each section thus provided is capable of acting as an independent spring is due, in part, to the fact that the shrinking strains in the rubber, as bonded to and between the outer and inner supporting rings or bands, produces an initial and independent tension in each section, and, in part, to the further fact that when torsional forces acting on the inner supporting ring or band are transmitted to the sections, the free space therebetween gives room for independent movement of the rubber mass of each section, thus increasing the shear and tension stresses in the rubber mass thereof, and preventing that piling up which induces compression, especially when the rubber body is constituted by a single continuous annular mass. It will be obvious that in a mounting having the radial sections separated by intervening spaces, as in the instant invention, a greater flexibility or resiliency of the mounting as a whole is attained with a given hardness of rubber consistency, and consequently this means that a motor or other mechanism supported by the novel mountings will attain a lower natural period of vibration for the same grade or degree of rubber hardness, than would be the case when a conventional continuous annular rubber body is used. This is of real advantage because it permits the use of harder and therefore greater wear resisting rubber consistency, and obviates the use of softer grades of rubber, as has heretofore been resorted to in an attempt to lower the natural vibration periodicity of the machine and mounting combination. In fact, in some applications of conventional mountings, it has been necessary to use rubber stocks so soft that the cost of the mounting has been substantially increased, although in so doing the physical strength and wearing resistance of the rubber mass and the strength of the bond thereof to the metallic supporting rings or bands has been greatly impaired.

This invention has for a further object to provide a construction of rubber mounting body which not only provides the radial sectional construction above referred to, but also provides a form thereof arranged to furnish continuous inner and outer circumferential bonding surfaces to engage the inner and outer supporting rings or bands therefor; and another object of the invention is to provide means for closing the outer sides of the spacing openings intermediate the radial sections of the body against accumulation of dirt and foreign matter therein, while at the same time conventionalizing the appearance of the mounting as a whole.

Other objects of this invention, not at this time more particularly enumerated, will be understood from the following detailed description of the same.

An illustrative embodiment of this invention, as provided for use as a mounting for dynamo-electric machines, is shown in the accompanying drawing, in which—

Similar characters of reference are employed in the above described views, to indicate corresponding parts.

Figure 1:
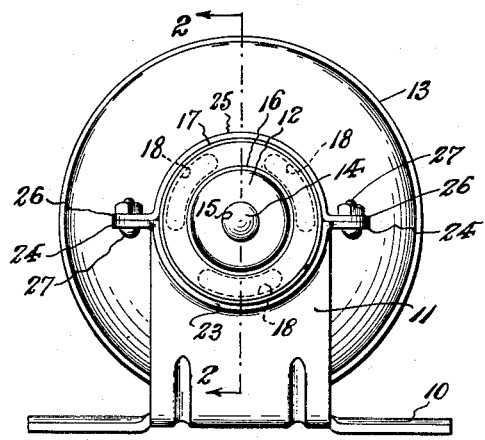
Fig. 1 is an end elevation of a dynamo-electric machine equipped with the novel vibration dampening mountings according to this invention.
Figure 3:
Fig. 3 is an edge view of a mounting made according to this invention.
Figure 2:
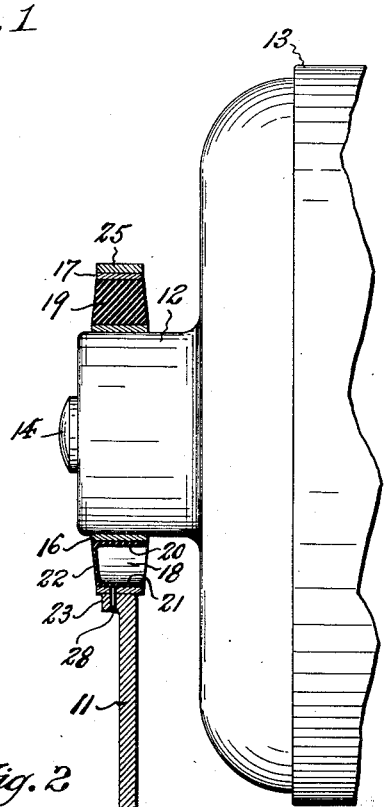
Fig. 2 is a fragmentary longitudinal sectional view, taken on line 2—2 in Fig. 1, but drawn on an enlarged scale.
Figure 4:
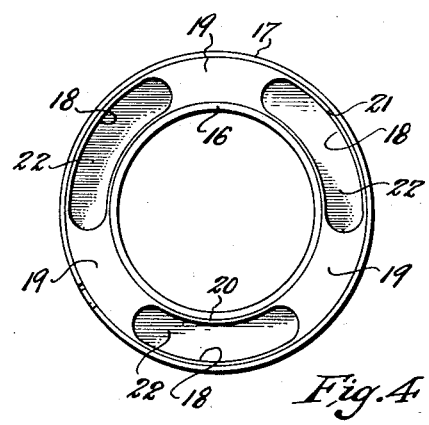
Fig. 4 is an inner side face view of the same.

In the drawing, the novel mounting embodying the principles of this invention is shown applied to a dynamo-electric machine having a stationary base 10 including upright frame members 11 to receive the hubs 12 of non-rotative body 13 of said machine. The rotating element of the machine is affixed to a shaft 14 journaled in the bores 15 of said hubs 12. One end only of the machine is shown, but it will be understood that the opposite ends thereof are substantially the same.

Vibratory forces induced by the operation of the dynamo-electric machine are dampened by the annular mountings which are interposed between the hubs 12 and the upright frame members 11. Each such mounting comprises an annular body of resilient rubber bonded, preferably by vulcanization, to and between an inner continuous metallic supporting ring or band 16 and an outer discontinuous metallic supporting ring or band 17. In making the rubber body preferably equi-spaced arcuate openings 18 are formed therein to thereby provide intermediate radial solid sections 19 likewise equi-spaced one from another. The width of said openings 18 are somewhat less than the total width of the rubber body, and consequently a continuous inner circumferential peripheral portion 20 and a continuous outer circumferential peripheral portion 21 are provided and bonded respectively to said inner and outer supporting rings or bands 16 and 17 to thereby provide an uninterrupted bonded adhesion of inner and outer circumferential surfaces of the rubber body to said respective rings or bands. Preferably the arcuate openings 18 enter through the rear face of the rubber body, but are of less depth than the transverse thickness of the latter, thereby forming thin closure walls 22 contiguous to and integral with the outer face portions of the rubber body. By this construction the rubber body is provided with a continuous closed outer face portion, which not only conventionalizes the exposed outer face of the mounting, but also guards the openings 18 against entrance thereto from the outside of dirt or foreign matter, which otherwise might accumulate therein both to the detriment of the appearance of the mounting as well as to the efficiency of its functional performance in use. While, as stated, such closed front construction of the mounting is desirable, it is not absolutely essential, and, consequently, said closure walls 22 may be optionally omitted.

In assembling the mountings in operative relation to and between the body of the machine and the upright frame members 11, the inner ring or band 16 of a mounting is forced tightly over and thus immovably affixed to and around the hub 12. The adjacent frame member 11 is provided at its upper end with a semi-circular seat portion 23 sized to receive and embrace the lower part of the outer ring or band 17 of the mounting. From the ends of said seat 23 extend perforate ears or lugs 24. Arranged to embrace the upper part of the outer ring or band 17 of the mounting is a clamp member 25 having perforate ears or lugs 26 to register with the ears or lugs 24 of the frame member 11. Said clamp member 25 is secured to the frame member 11 by bolts 27. In this manner, the inner ring or band 16 of the mounting is affixed to the machine body and the outer ring or band 17 to the frame member, thus disposing the rubber body of the mounting between these parts. In order to further assure the operative affixed relation of the outer ring or band 17 to the frame member 11, and especially against rotary shifting or displacement, a lock pin 28 may be engaged through the seat portion 23 and said outer ring or band. The above described means for assembling a mounting operatively between an end of the machine body and the adjacent supporting frame member is but illustrative of one of many ways of so doing, and it will be understood that the arrangement is subject to many variations in form and construction, the only essential requirement being that the inner ring or band of the mounting is fixedly related to the machine body end while the outer ring or band thereof is fixedly related to the adjacent frame member.

In operation torsional vibration of the machine body is dampened or absorbed by the circumferential shear and inherent tensional stresses of the radial sections 19. Owing to the provision of the openings 18 between said radial sections 19, the movements of the latter under shear and tensional stresses is not blocked by compression components, since said intervening openings allow space for unobstructed and more or less free movement of said radial sections with all the attendant advantages already hereinabove referred to.

While I have specifically described the use of the novel mountings in connection with dynamo-electric machines, it will be obvious that the same are also adapted for many other specific applications in connection with other types of mechanisms, as, for example, the mounting of automobile motors upon the chassis or frame work of the automotive vehicle, as well as in connection with various other types of mechanisms which are necessarily supported on carrying structures.

Having described my invention, I claim:

A mounting for the purposes described, comprising concentrically related inner and outer rings, and a body of resilient rubber disposed between said rings, said body having continuous inner and outer circumferential surface portions bonded respectively to said inner and outer rings, and said body having circumferentially spaced arcuate openings between said surface portions to provide solid radial body sections intermediate said openings, said radial body sections being individually free to react to shear and tensional stresses, to which the body is subjected in use, substantially free from compression component resistance thereto, and closure walls contiguous to and integral with at least one side of said body for closing said openings at said side of the body.

HOMER J. LOFTIS.